United States Patent
Dey et al.

(10) Patent No.: US 11,249,488 B2
(45) Date of Patent: Feb. 15, 2022

(54) SYSTEM AND METHOD FOR OFFLOADING ROBOTIC FUNCTIONS TO NETWORK EDGE AUGMENTED CLOUDS

(71) Applicant: Tata Consultancy Services Limited, Mumbai (IN)

(72) Inventors: Swarnava Dey, Kolkata (IN); Arijit Mukherjee, Kolkata (IN)

(73) Assignee: Tata Consultancy Services Limited, Mumbai (IN)

(*) Notice: Subject to any disclaimer, the term of this patent is extended or adjusted under 35 U.S.C. 154(b) by 585 days.

(21) Appl. No.: 15/824,758

(22) Filed: Nov. 28, 2017

(65) Prior Publication Data

US 2018/0150085 A1    May 31, 2018

(30) Foreign Application Priority Data

Nov. 28, 2016  (IN) .............................. 201621040595

(51) Int. Cl.
  *G05D 1/02*  (2020.01)
  *H04L 29/08*  (2006.01)
  (Continued)

(52) U.S. Cl.
  CPC ............ *G05D 1/0274* (2013.01); *B25J 9/161* (2013.01); *B25J 9/1697* (2013.01); *G05B 19/418* (2013.01);
  (Continued)

(58) Field of Classification Search
  CPC .. G05D 1/0274; G05D 1/0227; G05B 19/418; G05B 2219/34019; G05B 2219/33333; B25J 9/161; B25J 9/1697
  (Continued)

(56) References Cited

U.S. PATENT DOCUMENTS 9,026,248 B1 * 5/2015 Hickman .................. B25J 3/00
                                                         700/248
9,031,692 B2    5/2015 Zhu
                (Continued)

OTHER PUBLICATIONS

Chen, X. et al. (Oct. 2015). "Efficient Multi-User Computation Offloading for Mobile-Edge Cloud Computing," *IEEE/ACM Transactions on Networking*, vol. 24, issue 5; pp. 2795-2808.

(Continued)

*Primary Examiner* — Khoi H Tran
*Assistant Examiner* — Rodney P King
(74) *Attorney, Agent, or Firm* — Finnegan, Henderson, Farabow, Garrett & Dunner, LLP

(57) ABSTRACT

A system and method for offloading scalable robotic tasks in a mobile robotics framework. The system comprises a cluster of mobile robots and they are connected with a back-end cluster infrastructure. It receives scalable robotic tasks at a mobile robot of the cluster. The scalable robotics tasks include building a map of an unknown environment by using the mobile robot, navigating the environment using the map and localizing the mobile robot on the map. Therefore, the system estimate the map of an unknown environment and at the same time it localizes the mobile robot on the map. Further, the system analyzes the scalable robotics tasks based on computation, communication load and energy usage of each scalable robotic task. And finally the system priorities the scalable robotic tasks to minimize the execution time of the tasks and partitioning the SLAM with computation offloading in edge network and mobile cloud server setup.

6 Claims, 3 Drawing Sheets

(51) Int. Cl.
  *G06Q 10/06* (2012.01)
  *B25J 9/16* (2006.01)
  *G05B 19/418* (2006.01)

(52) U.S. Cl.
  CPC ..... *G05D 1/0227* (2013.01); *G06Q 10/06311* (2013.01); *H04L 67/10* (2013.01); *H04L 67/1097* (2013.01); *H04L 67/12* (2013.01); *G05B 2219/33333* (2013.01); *G05B 2219/34019* (2013.01)

(58) Field of Classification Search
  USPC ........................................................ 700/248
  See application file for complete search history.

(56) References Cited

U.S. PATENT DOCUMENTS

| | | | | |
|---|---|---|---|---|
| 9,176,562 | B2 * | 11/2015 | de Wit | G06F 1/3203 |
| 9,427,874 | B1 * | 8/2016 | Rublee | B25J 9/1697 |
| 9,679,490 | B2 * | 6/2017 | Ceribelli | G05D 1/0005 |
| 2011/0288684 | A1 | 11/2011 | Farlow et al. | |
| 2016/0110625 | A1 * | 4/2016 | Vaughan | G06T 7/11 382/103 |
| 2016/0244187 | A1 * | 8/2016 | Byers | A47G 29/14 |

OTHER PUBLICATIONS

Kovachev, D. et al. (Dec. 2012). "Framework for Computation Offloading in Mobile Cloud Computing," *International Journal of Interactive Multimedia and Artificial Intelligence*, vol. 1, issue 7; pp. 6-15.

\* cited by examiner

SYSTEM AND METHOD FOR OFFLOADING ROBOTIC FUNCTIONS TO NETWORK EDGE AUGMENTED CLOUDS

PRIORITY CLAIM

This U.S. patent application claims priority under 35 U.S.C. § 119 to India Application No. 201621040595, filed on Nov. 28, 2016. The entire contents of the aforementioned application are incorporated herein by reference.

TECHNICAL FIELD

The embodiments herein generally relates to a system and method for offloading one or more scalable robotics tasks of a cluster of mobile robots and, more particularly, recommending a comprehensive framework for offloading computationally expensive simultaneous localization and mapping tasks for a mobile robot in cluster of mobile robots.

BACKGROUND

Mobile robots are generally constrained devices in terms of processing power, storage capacity and energy. Cloud robotics and robotic clusters are two prevalent approaches used to augment mobile robot's processing power performing complex robotic tasks including multi-robot simultaneous localization and mapping (SLAM), robotic vision etc. In cloud robotics, mobile robots use remote cloud server over the internet as resources for offloading intensive computation. Though computation offloading in cloud robotics rendered complex tasks such as map merging, cooperative navigation etc.

Cloud robotics in its current form assumes continuous connectivity to the back-end cloud infrastructure. However, in real world situations, especially in disaster scenarios, such assumptions does not hold. To handle the intermittent cloud connectivity and to meet the requirement of latency sensitive applications, there is a need to offload the computationally expensive simultaneous localization and mapping task for mobile robots. Whereas, performing such tasks by sharing computation load among the peer robots, forming a cluster, is not always feasible due to energy and processing power constraints in robots and non-availability of memory for complex tasks such as map merging, map storage etc. Further, a model is needed for offloading decision in the current setup where the results demonstrates the efficacy of the proposed dynamic offloading framework over static offloading strategies.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In view of the foregoing, an embodiment herein provides a system and method dynamically offloading one or more tasks in a mobile robotics framework.

In one aspect, a system for dynamically offloading one or more tasks in a mobile robotics framework. The system comprises a processor, a memory communicatively coupled to the processor and the memory contains instructions that are readable by the processor, a plurality of mobile robots, an analysis module and a means for offloading. Whenever the system receives one or more scalable robotic tasks at a mobile robot of a cluster of mobile robots, the system estimates a map of an unknown environment and at the same time the mobile robot localize itself on the map. It analyses the scalable robotic tasks for offloading to external resources based on computation, communication load and energy usage of each scalable robotic task. The analysis module priorities the one or more scalable robotic tasks to minimize the execution time of the one or more scalable robotic tasks of the mobile robot. Herein, the external resources comprising a mobile cloud and an edge of a network. Further, the system is partitioning a robotic SLAM to meet latency requirements to achieve accurate robot localization and to build a map of the unknown environment.

In another aspect, a method for dynamically offloading one or more tasks in a mobile robotics framework. It receives one or more scalable robotic tasks at a mobile robot of a cluster of mobile robots, wherein the one or more scalable robotic tasks include building a map of an unknown environment by using the mobile robot navigating the environment using the map and localizing the mobile robot on the map. Then the process estimates the map of an unknown environment by using the mobile robot, wherein at the same time the mobile robot localizes itself on the map. Further, the process analyses the one or more scalable robotic tasks for offloading to one or more external resources based on computation, communication load and energy usage of each scalable robotic task, wherein the analysis module priorities the one or more scalable robotic tasks to minimize the execution time of the one or more scalable robotic tasks of the mobile robot. Therefore, the process offloads the one or more scalable robotic tasks to one or more external resources, wherein the one or more external resources comprising a mobile cloud and an edge of a network.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in non-transitory computer readable medium and so executed by a computing device or processor, whether or not such computing device or processor is explicitly shown.

BRIEF DESCRIPTION OF THE DRAWINGS

The embodiments herein will be better understood from the following detailed description with reference to the drawings, in which.

DETAILED DESCRIPTION OF EMBODIMENTS

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
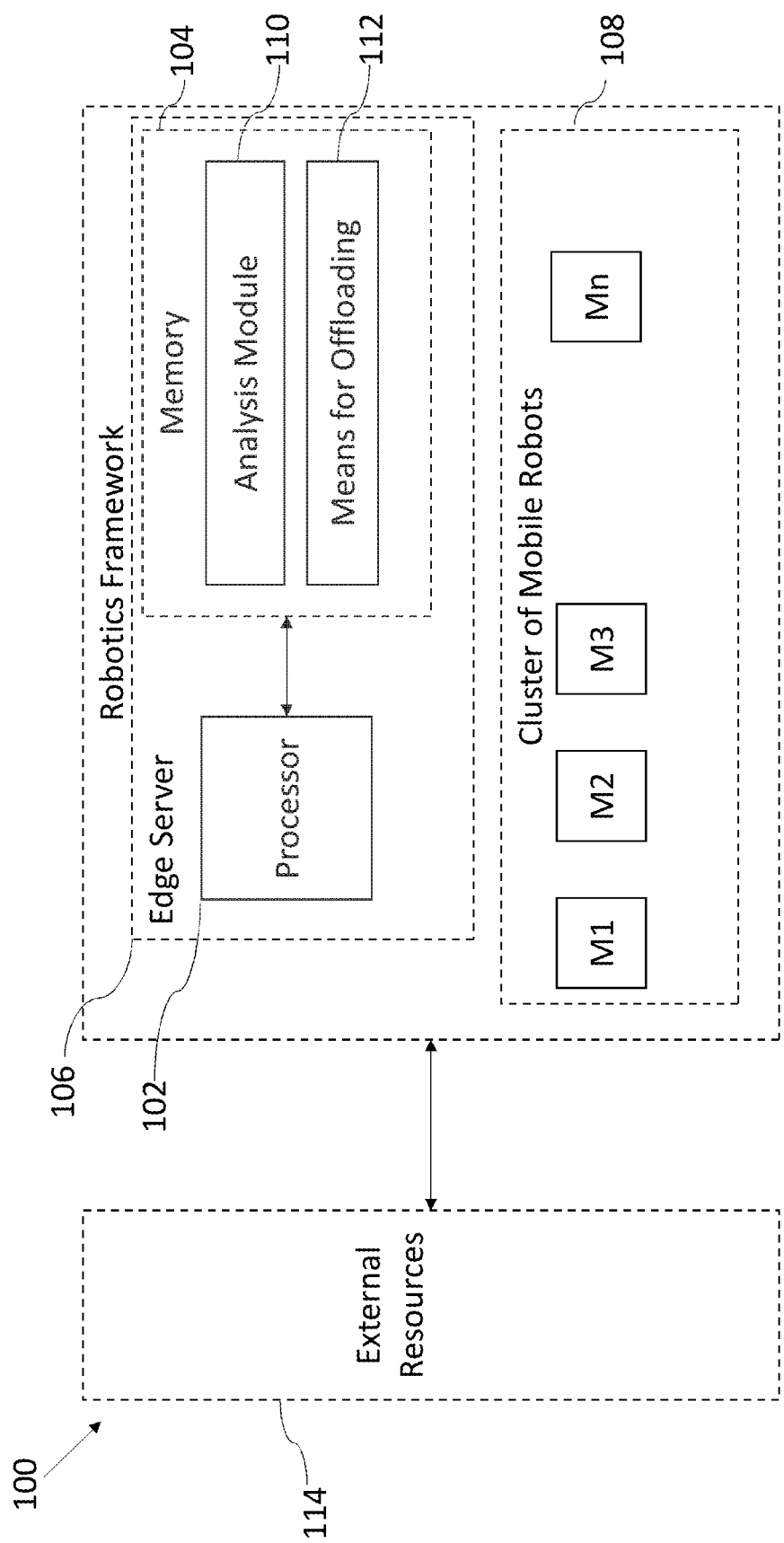
FIG. 1 illustrates a system for dynamically offloading one or more tasks in a mobile robotics framework according to an embodiment of the present disclosure.

Referring FIG. 1, a system 100 for dynamically offloading one or more tasks in a mobile robotics framework. The system 100 comprising a processor 102, a memory 104 communicatively coupled to the processor 102, an edge network server(s) 106, a cluster of mobile robots 108, an analysis module 110, means for offloading the one or more scalable robotics tasks 112 and external resources 114.

In the preferred embodiment, the memory 104 contains instructions that are readable by the processor 102.

In the preferred embodiment, in a robotic framework, being executed on the edge network server(s) 106, the cluster of mobile robots (M1, M2, M3 . . . Mn) 108 which are configured to connect both with the said edge network server and a back-end cloud infrastructure. One mobile robot of the cluster of mobile robots receives one or more scalable robotics tasks. These one or more scalable robotics tasks include building a map of an unknown environment by using the mobile robot, navigating the environment using the map and localizing the mobile robot on the map.

In the preferred embodiment, the system 100 is configured to estimate the map of unknown environment by using the mobile robot. This is accomplished by extracting features commonly known as landmarks from the unknown environment and re-observing when the mobile robot moves around. When the mobile robot moves the uncertainty pertaining to the mobile robots new position needs to be updated using odometry.

In the preferred embodiment, the analysis module 110, being executed on the edge network server 106, is configured to analyze the one or more scalable robotics tasks for offloading to one or more external resources based on computation, communication load and energy usage of each scalable robotics tasks. Further, the analysis module priorities the one or more scalable robotics tasks to minimize the execution time of the one or more scalable robotics tasks of the mobile robot. It would be appreciated that the tasks processing time and the data transfer time between one or more resources and the mobile robot to be same for each scalable robotics tasks. Further, the processing time is assumed to be same for all tasks operating on the same dataset, executing in the same category of the external resources. In this disclosure the external resources comprising a mobile cloud and an edge of a network.

Figure 2:
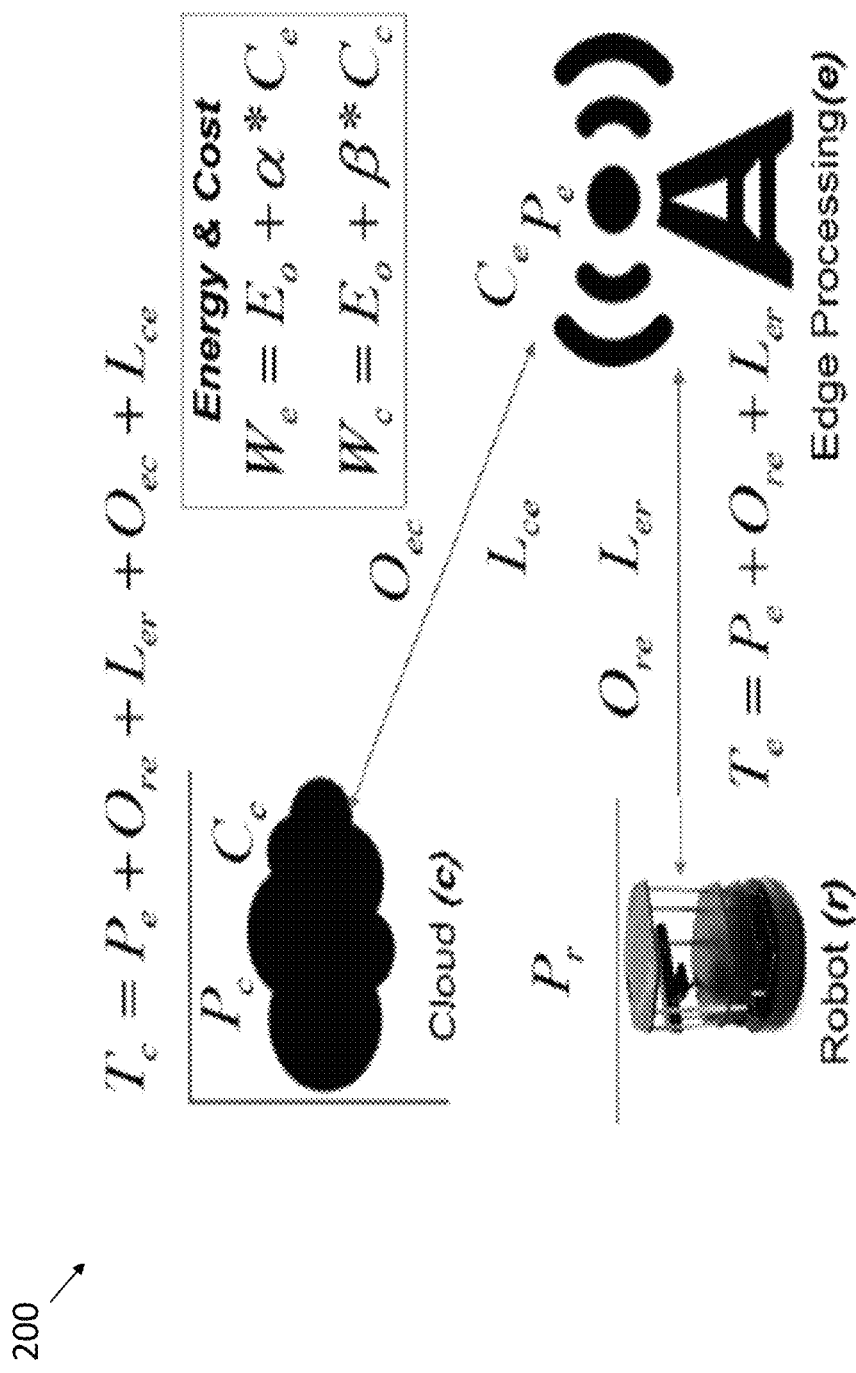
FIG. 2 illustrates an example of SLAM offloading according to an embodiment of the present disclosure.

FIG. 2, an example, illustrates a model for the offloading decision. Herein Pr, Pe, Pc denote a particle's scan processing time in robot, edge and cloud respectively. Further, Ore denote the time to send observation and odometry data from robot to edge and Oec from edge to cloud for further offloading. Lre denote the time to send location update from edge to robot and Lec from cloud to edge. For each particle's scan processing time at edge is denoted by $Te=Pe+Ore+Ler$, and at cloud $Tc=Pc+Ore+Oec+Lec+Lce$.

For each particle, let Er denotes the processing energy in the robot and there is no other cost involved. Eo denotes the energy overhead to transfer observation and odometry and receive location update from robot. Ce and Cc denote the scan processing cost per particle in the edge and the cloud respectively.

For each particle the weighted sum of processing cost and data transfer energy overhead at edge is denoted by We=Eo+Ce and at cloud by We=Eo+Cc. Formally, the edge server solves the following integer linear program shown below under the initial SLAM algorithm run scenario given in section 4.1 for getting the values x1, x2, x3:

$$T = \min((x_1 * E_r + x_2 * W_a + x_3 * W_c) + \rho * \max (x_1 * P_{r_3} x_2 * T_{e_3} x_3 * T_c)) \quad (1)$$

such that:

$$x_1 + x_2 + x_3 \leq X \quad (2)$$

$$x_1 * W \leq E^{thr} \quad (3)$$

$$x_1 * E_r \leq E^{thr} \quad (4)$$

$$x_1 * E_0 \leq E^{thr} \quad (5)$$

$$\max(x_1 * P_{r_1} x_2 * T_{e_1} x_3 * T_c \leq T^{rea} \quad (6)$$

and $$x_1 \geq 0 \, i = 1, 2 \ldots X (\text{integers}) \quad (7)$$

The objective function is a weighted sum of cost to load and time to process the particles, where p is the weight. The first constraint stipulates that the summation of assigned particles in the resources must be less than the total number of particles used to run that SLAM algorithm. The second constraint stipulates that the maximum number of particles that can be assigned to the robot is bounded by an energy threshold (Ethr) where w is a factor relating energy consumed for processing a particle at robot. The third and fourth constraints are essentially same as the second one, but take into account explicit energy usage for particle processing and data transfer by the robot. The fifth constraint relates to the real time response required (Tres) for the robot to get location update to ensure moving at a certain speed.

In the preferred embodiment, the system 100 has means to offload the one or more scalable robotics tasks 112. The system is partitioning simultaneous localization and mapping (SLAM) execution between the mobile robot and the one or more external resources 114. Further, the partitioning SLAM is to meet latency requirements, to achieve accurate robot localization and to build a map of the unknown environment. Wherein the SLAM is a latency monitoring framework which estimates the latency distribution while offloading one or more scalable robotics tasks.

Figure 3:
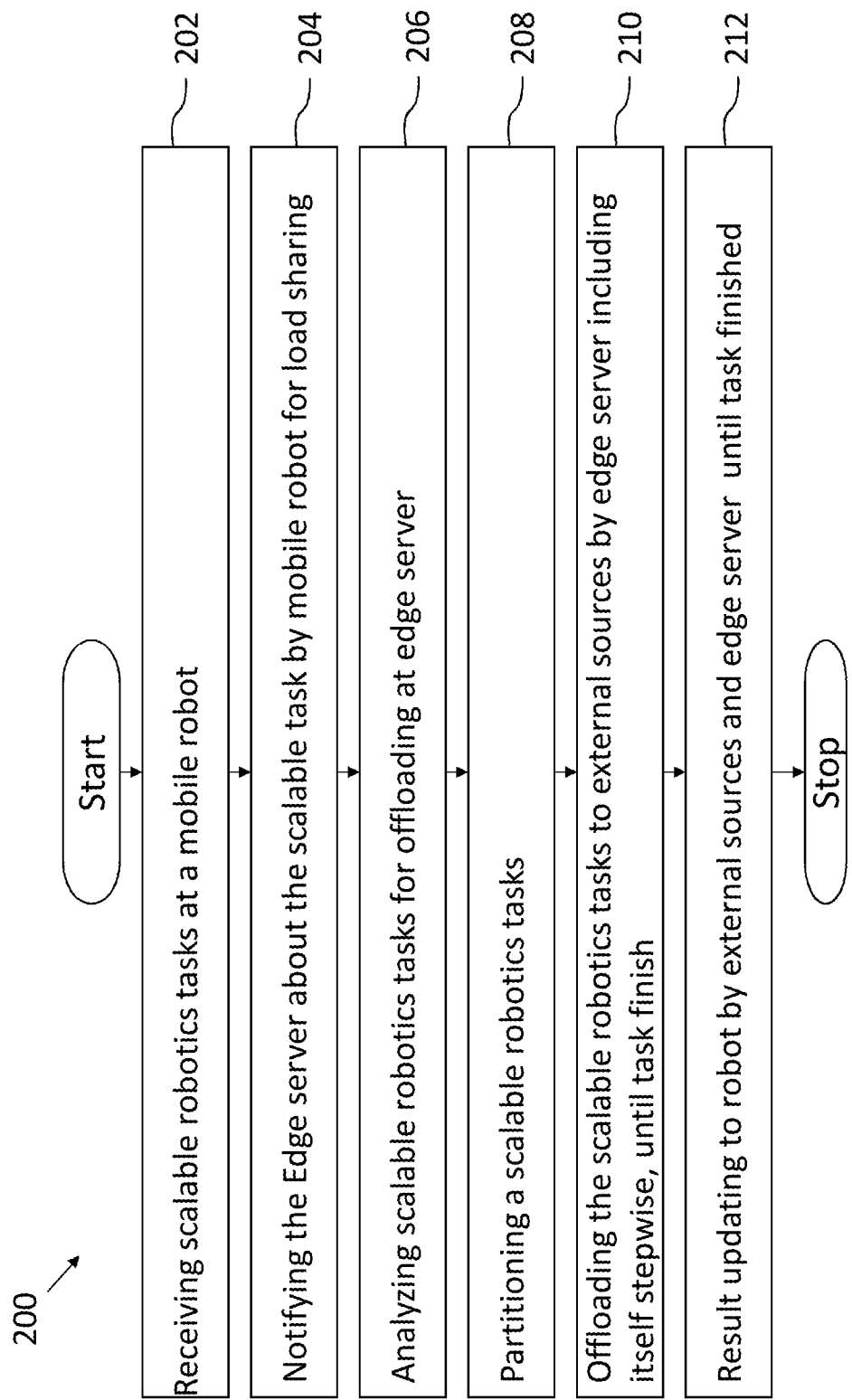
FIG. 3 illustrates a method for dynamically offloading one or more tasks in a mobile robotics framework according to an embodiment of the present disclosure.

Referring FIG. 3, a method 200 for dynamically offloading one or more tasks in a mobile robotics framework.

At step 202, where one of the robot receives one or more scalable robotic tasks at a mobile robot of a cluster of mobile robots, wherein the one or more scalable robotic tasks include building a map of an unknown environment by using the mobile robot, navigating the environment using the map and localizing the mobile robot on the map.

At step 204, where the process is notifying the edge server about the scalable robotics tasks by the mobile robot for load sharing.

At step 206, where the process analyzing at the edge network server, the one or more scalable robotic tasks for offloading to one or more external resources based on computation, communication load and energy usage of each scalable robotic task, wherein the analysis module priorities the one or more scalable robotic tasks to minimize the execution time of the one or more scalable robotic tasks of the mobile robot.

At step 208, where the process at edge network server partitioning the one or more scalable robotic tasks to offload them to one or more external resources wherein the one or more external resources comprising a mobile cloud and an edge of a network.

At step 210, where the process at robot offloads computation of the one or more offloaded scalable robotics tasks at one or more external resources. It sends the one or more scalable robotics task partitions from the mobile robot to the edge and from the edge to the back-end cloud infrastructure and receives the results until the task is fully completed.

Finally at step 212, the process comprising updating the result to the mobile robot by the external resources and edge server until the offloaded task is finished.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

A system and method for offloading one or more scalable robotic tasks in a mobile robotics framework. The system comprises cluster of mobile robots and they are configured in such a manner to connect with a back-end cluster infrastructure. It receives one or more scalable robotic tasks at a mobile robot of the cluster. These scalable robotics task include building a map of an unknown environment by using the mobile robot, navigating the environment using the map and localizing the mobile robot on the map. Therefore, the system uses the mobile robot to estimate the map of an unknown environment and at the same time the system localizes the mobile robot on the map. An analysis module of the system analyze the one or more scalable robotics tasks for offloading to one or more external resources based on computation, communication load and energy usage of each scalable robotic task. The analysis module priorities the one or more scalable robotic tasks to minimize the execution time of the one or more scalable robotic tasks of the mobile robot. Further, the system is configured to partition the SLAM with computation offloading in edge network and mobile cloud server setup. And the system offloads the one or more scalable robotics tasks to external resources.

The embodiments of present disclosure herein addresses unresolved problem of offloading computationally expensive simultaneous localization and mapping tasks for mobile robots to cloud robotics platform suitability where connectivity to external network is intermittent and applications have low latency requirements.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or non-transitory computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

What is claimed is:

1. A method for offloading one or more scalable robotic tasks in a mobile robotics framework, wherein the method comprising:

receiving the one or more scalable robotic tasks at a mobile robot of a cluster of mobile robots, wherein the one or more scalable robotic tasks include building a map of an unknown environment by using the mobile robot, navigating the environment using the map and localizing the mobile robot on the map;

notifying an edge network server about the one or more scalable robotics tasks by the mobile robot for load sharing;

estimating the map of an unknown environment by using the mobile robot, wherein at the same time the mobile robot localizes itself on the map;

analyzing, by the edge network server, the one or more scalable robotic tasks for offloading to one or more external resources based on computation, communication load and energy usage of each scalable robotic task, wherein the one or more scalable robotic tasks are prioritized to minimize the execution time of the one or more scalable robotic tasks of the mobile robot, wherein the one or more scalable robotic tasks are prioritized based on maximum number of tasks that can be assigned to the mobile robot, energy threshold ($E^{thr}$) of the mobile robot, energy usage for task processing and data transfer by the mobile robot, and real-time response time required ($T^{res}$) for the mobile robot to get location update, and wherein the tasks processing time and data transfer time between the one or more external resources and the mobile robot are same for each of the one or more scalable robotics tasks;

partitioning, by the edge networks server, simultaneous localization and mapping (SLAM) between the mobile robot and the one or more external resources;

offloading, by the edge networks server, the one or more scalable robotic tasks to one or more external resources based on the analysis, wherein the one or more external resources comprising a mobile cloud and an edge of a network; and executing computation of the one or more offloaded scalable robotic tasks at the one or more external resources comprising steps of:

sending the one or more offloaded scalable robotic tasks from the mobile robot to the edge and from the edge to a back-end cloud infrastructure;

sharing one or more location updates from the back-end cloud infrastructure to the edge and from the edge to the mobile robot; and updating results of the one or more scalable offloaded scalable robotic tasks from each of the one or more external resources and the edge network server to the mobile robot.

2. The method claimed in claim 1, wherein
the SLAM partitioning is to meet latency requirements, to achieve accurate mobile robot localization and to build the map of the unknown environment.

3. A system for offloading one or more scalable robotic tasks in a mobile robotics framework, wherein the system comprising:

a memory with a set of instructions;

a cluster of mobile robots which are configured to connect with a back-end cloud infrastructure, wherein at a mobile robot of the cluster of mobile robots receives one or more scalable robotic tasks, and wherein the mobile robot notifies an edge network server about the one or more scalable robotics tasks for load sharing; and at least a processor, wherein the processor is communicatively coupled to the memory, and wherein the processor is configured to:

analyze the one or more scalable robotic tasks for offloading to one or more external resources based on computation, communication load and energy usage of each scalable robotic task, wherein the one or more external resources comprising a mobile cloud and an edge of a network, and wherein the one or more scalable robotic tasks are prioritized to minimize the execution time of the one or more scalable robotic tasks of the mobile robot, wherein the one or more scalable robotic tasks are prioritized based on maximum number of tasks that can be assigned to the mobile robot, energy threshold ($E^{thr}$) of the mobile robot, energy usage for task processing and data transfer by the mobile robot, and real-time response time required ($T^{res}$) for the mobile robot to get location update, and wherein the tasks processing time and data transfer time between the one or more external resources and the mobile robot are same for each of the one or more scalable robotics tasks;

offload the one or more scalable robotic tasks to one or more external resources based on the analysis, wherein a simultaneous localization and mapping (SLAM) is partitioned to meet latency requirements, to build a map of the unknown environment, to navigate the environment using the map and to localize the mobile robot on the map; and executing computation of the one or more offloaded scalable robotic tasks at the one or more external resources comprising steps of:

sending the one or more offloaded scalable robotic tasks from the mobile robot to an edge and from the edge to a back-end cloud infrastructure;

sharing one or more location updates from the back-end cloud infrastructure to the edge and from the edge to the mobile robot; and updating results of the one or more scalable offloaded scalable robotic tasks from each of the one or more external resources and the edge network server to the mobile robot.

4. The system claimed in claim 3, wherein the system estimates the map of an unknown environment by using the mobile robot, wherein at the same time the mobile robot localizes itself on the map.

5. A non-transitory computer readable medium storing instructions for offloading one or more scalable robotic tasks in a mobile robotics framework, the instructions comprise:

receiving the one or more scalable robotic tasks at a mobile robot of a cluster of mobile robots, wherein the one or more scalable robotic tasks include building a map of an unknown environment by using the mobile robot, navigating the environment using the map and localizing the mobile robot on the map;

notifying an edge network server about the one or more scalable robotics tasks by the mobile robot for load sharing;

estimating the map of an unknown environment by using the mobile robot, wherein at the same time the mobile robot localizes itself on the map;

analyzing, by the edge network server, the one or more scalable robotic tasks for offloading to one or more external resources based on computation, communication load and energy usage of each scalable robotic task, wherein the one or more scalable robotic tasks are prioritized to minimize the execution time of the one or more scalable robotic tasks of the mobile robot, wherein the one or more scalable robotic tasks are prioritized based on maximum number of tasks that can be assigned to the mobile robot, energy threshold ($E^{thr}$) of the mobile robot, energy usage for task processing and data transfer by the mobile robot, and real-time response time required ($T^{res}$) for the mobile robot to get location update, and wherein the tasks processing time and data transfer time between the one or more external resources and the mobile robot are same for each of the one or more scalable robotics tasks;

partitioning, by the edge networks server, simultaneous localization and mapping (SLAM) between the mobile robot and the one or more external resources;

offloading, by the edge networks server, the one or more scalable robotic tasks to one or more external resources based on the analysis, wherein the one or more external resources comprising a mobile cloud and an edge of a network; and executing computation of the one or more offloaded scalable robotic tasks at the one or more external resources comprising steps of:

sending the one or more offloaded scalable robotic tasks from the mobile robot to the edge and from the edge to a back-end cloud infrastructure;

sharing one or more location updates from the back-end cloud infrastructure to the edge and from the edge to the mobile robot; and updating results of the one or more scalable offloaded scalable robotic tasks from each of the one or more external resources and the edge network server to the mobile robot.

6. The non-transitory computer readable medium claimed in claim 5, wherein the SLAM partitioning is to meet latency requirements, to achieve accurate mobile robot localization and to build the map of the unknown environment.

* * * * *